(12) United States Patent
Cobb

(10) Patent No.: US 9,139,250 B2
(45) Date of Patent: Sep. 22, 2015

(54) BRAKE ASSEMBLY FOR BICYCLES

(71) Applicant: John Cobb, Tyler, TX (US)

(72) Inventor: John Cobb, Tyler, TX (US)

( * ) Notice: Subject to any disclaimer, the term of this patent is extended or adjusted under 35 U.S.C. 154(b) by 0 days.

(21) Appl. No.: 14/162,974

(22) Filed: Jan. 24, 2014

(65) Prior Publication Data

US 2014/0262631 A1 Sep. 18, 2014

(30) Foreign Application Priority Data

Mar. 13, 2013 (TW) .............................. 102204539 U

(51) Int. Cl.
*B62L 1/16* (2006.01)
(52) U.S. Cl.
CPC ....................................... *B62L 1/16* (2013.01)
(58) Field of Classification Search
CPC ................ B62L 1/10; B62L 1/14; B62L 1/16
See application file for complete search history.

(56) References Cited

U.S. PATENT DOCUMENTS

2007/0251768 A1 * 11/2007 Sandro et al. .............. 188/24.12

FOREIGN PATENT DOCUMENTS

| FR | 641026 | A | * | 9/1927 |
| FR | 0915017 | A | * | 5/1945 |
| FR | 0911555 | A | * | 6/1945 |

* cited by examiner

*Primary Examiner* — Anna Momper
(74) *Attorney, Agent, or Firm* — Rosenberg, Klein & Lee

(57) ABSTRACT

A brake assembly includes a base having two first connection parts and each first connection part has a first hole and a second hole. Two second connection parts extend from the underside of the base. Two arms are pivotably connected to the two second connection parts. A driving member has a driving part and a positioning portion. The driving part has two curved driving face formed on two ends thereof. The driving member is connected to the first hole by a rod, and a brake cable is connected to the positioning portion. The action members are respectively located in the two second holes. When the driving member is pivoted by the brake cable, the driving member pushes the action members to pivot the arms to brake the wheel. The driving member allows the force to be sent to the brake pads directly and quickly, and the brake assembly is light and compact.

18 Claims, 19 Drawing Sheets

BRAKE ASSEMBLY FOR BICYCLES

FIELD OF THE INVENTION

The present invention relates to a brake assembly for a bicycle, and more particularly, to a driving member of the brake assembly to increase the braking efficiency. The brake assembly is light and compact.

BACKGROUND OF THE INVENTION

The bicycles are welcomed to people not only for transportation but also for leisure activities. Along with the time for operating the bicycles increases, the safety for the cyclists are more concerned and the brake assembly for bicycles are directly related to the safety of the cyclists.

The conventional brake assembly for bicycles is connected to front fork or the seat stays, and generally comprises two arms and each arm has a brake pad connected thereto. The brake cable is connected to one side or the central portion of the arms so that the two arms are pivoted toward each other to allow the brake pads to contact the rim to stop the rim, such that the speed of the bicycle can be controlled.

For the brake cable connected to the central portion of each of the arms, the brake cables can be controlled by the cables or by hydraulic power.

Taiwan Utility Model No. 098209027 discloses a brake assembly which comprises two arms and a link, wherein each arm has a pivotal section which is connected with a pivot. Each arm has an installation section which extends from the underside of the pivotal section so that the brake pad is connected to the installation section. Each arm has a curved driven section which extends from the top of the pivotal section. Two resilient members are respectively connected between the bicycle and the arms to return the arms after braking. The link is located between the arms and has a contact face which contacts the two driven sections. The brake cable is connected to the center of the link so that the link is moved upward to push the connection portions of the two arms so that the arms are pivoted.

Taiwan Patent No. 101113861 discloses a brake assembly which comprises a first arm and a second arm, wherein each of the two arms has a top axial portion and a bottom axial portion. The top axial portion and the bottom axial portion are located in separate by a pivot. The bottom axial portion is used to maintain a brake pad, and the top axial portion is engaged with at least one hydraulic cylinder. The top axial portion of each of the right and left arms is connected to the at least one hydraulic cylinder by a wedge-shaped member. The hydraulic cylinder is located between the right arm and the left arm, and is designed to move the wedge-shaped member.

For Taiwan Utility Model No. 098209027, each arm has a curved driven section which extends from the top of the pivotal section, and the link is located between the arms and the brake cable is connected to the center of the link so that when the link is moved upward, the arms are pivoted by the movement of the link to brake the wheel. For Taiwan Patent No. 101113861, the hydraulic cylinder is located between the right arm and the left arm, and the wedge-shaped member is moved upward or downward when the hydraulic cylinder is operated so that the right arm and the left arm are pivoted to brake.

However, either of the two disclosures has longer distance between the brake cable and the link so that the operation force cannot transmitted directly, and this cause the braking force to be reduced. Besides, rollers are located between the arms and the link or wedge-shaped member, and the rollers increase the weight of the brake assembly. Furthermore, the driven sections and the link are easily stocked because of deformation due to the force applied thereto. When the situation is happened on one side, the two arms are not evenly operated to affect the brake efficiency and the rim is easily damaged. If the brake assembly is cooperated with the hydraulic cylinder, leaking of the hydraulic cylinder happens frequently, and the rod in the hydraulic cylinder shakes when the rod moves axially, this can also make the two arms to be operated unevenly. In addition, the hydraulic force is powerful and cab easily damage the parts of the brake assembly.

The present invention intends to provide a brake assembly which improves the shortcomings of the above mentioned conventional brake assemblies.

SUMMARY OF THE INVENTION

The present invention relates to a brake assembly and comprises a base having two first connection parts and each first connection part has a first hole and a second hole. Two second connection parts extend from the underside of the base. Two arms are pivotably connected to the two second connection parts. A driving member has a driving part and a positioning portion. The driving part has two curved driving face formed on two ends thereof. The driving member is connected to the first hole by a rod, and a brake cable is connected to the positioning portion. The action members are respectively located in the two second holes. When the driving member is pivoted by the brake cable, the driving member pushes the action members to pivot the arms to brake the wheel. The driving member allows the force to be sent to the brake pads directly and quickly, and the brake assembly is light and compact.

The brake assembly of the present invention has a driving member on the base and the driving member is connected with the brake cable. The driving member has a driving part on outside thereof and the driving part has two curved driving faces formed on two ends thereof. Two action members are respectively located between the arms and the two curved driving faces. When the driving member is pivoted by the brake cable, the driving member pushes the action members to pivot the arms to brake the wheel. The distance between the brake pads and the brake cable is short so that the transmission of the force is direct and quick. The number of the parts of the brake assembly is less than the conventional brake assemblies so that the brake assembly is light and compact. The brake assembly reduces wind resistance. The two curved driving faces of the driving member move the action members to move linearly and the two curved driving faces are smooth surfaces so that the action members are driven easily so that the arms are evenly pivoted to ensure the braking feature. Each arm has an extension section which is connected with a first returning member to return the two arms. Two second returning members are connected between the two arms and the base to return the two arms and to shorten the length of the extension section to further reduce the weight.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
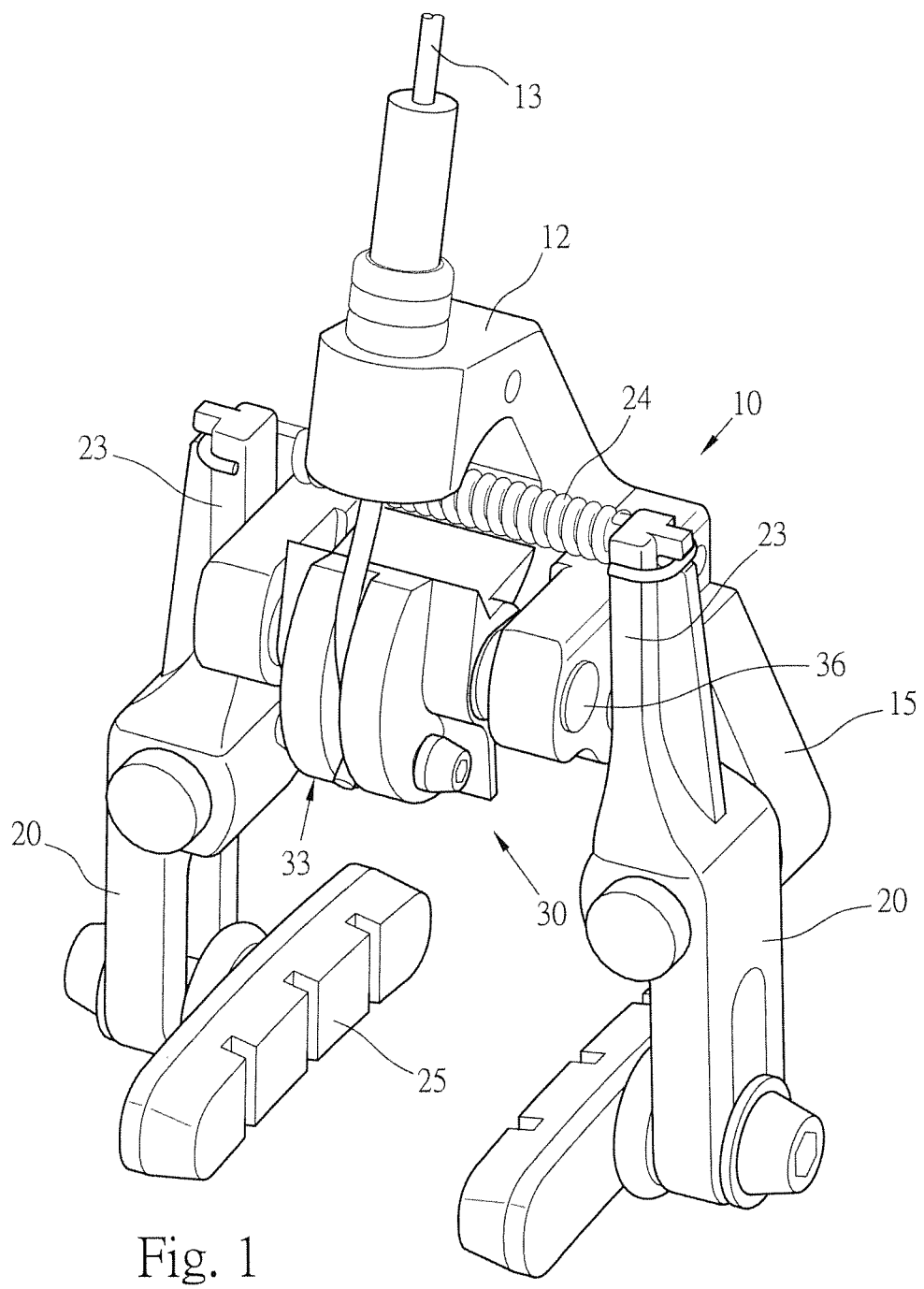
FIG. 1 is a perspective view to show the brake assembly of the present invention.
Figure 2:
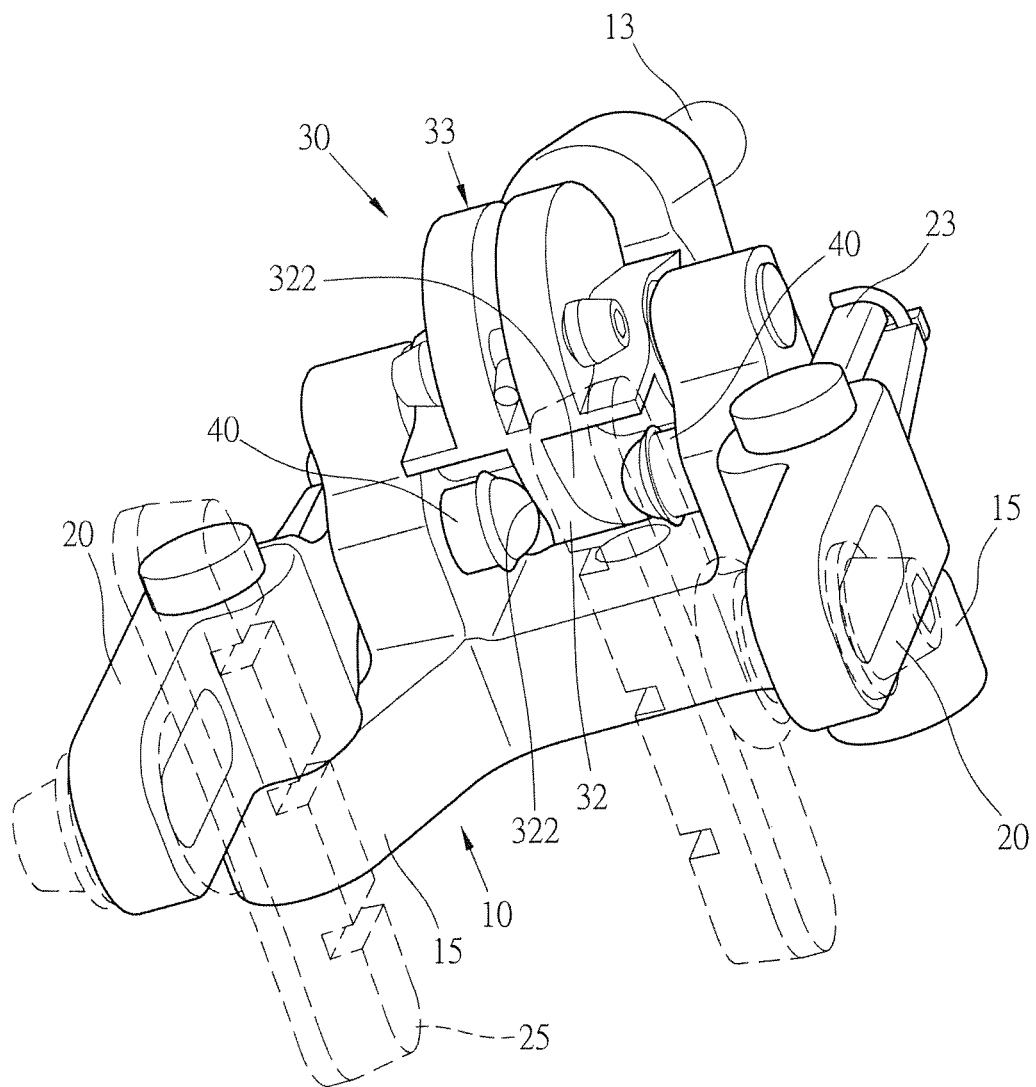
FIG. 2 is another perspective view to show the brake assembly of the present invention.
Figure 3:
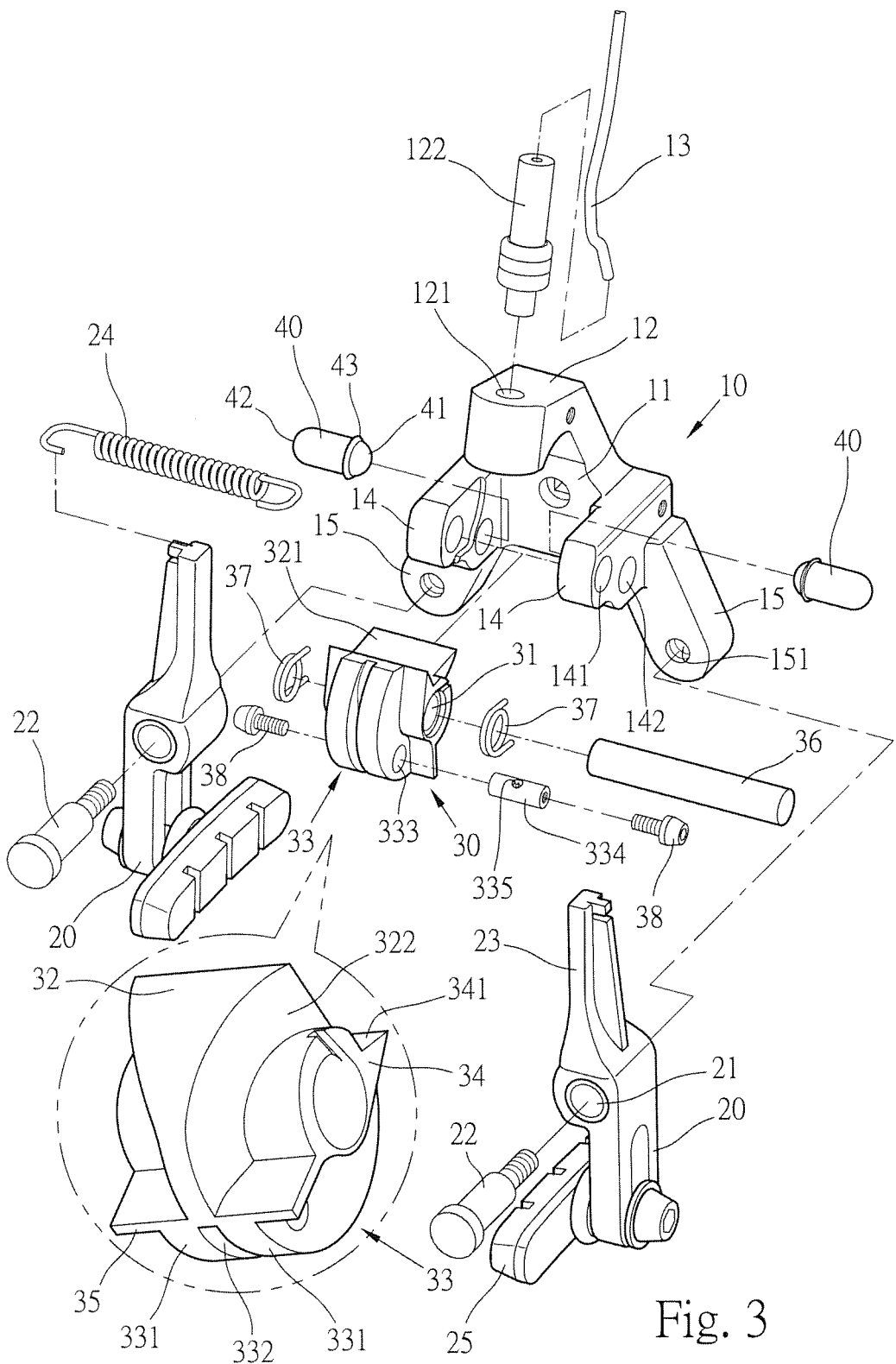
FIG. 3 is an exploded view to show the brake assembly of the present invention.
Figure 4:
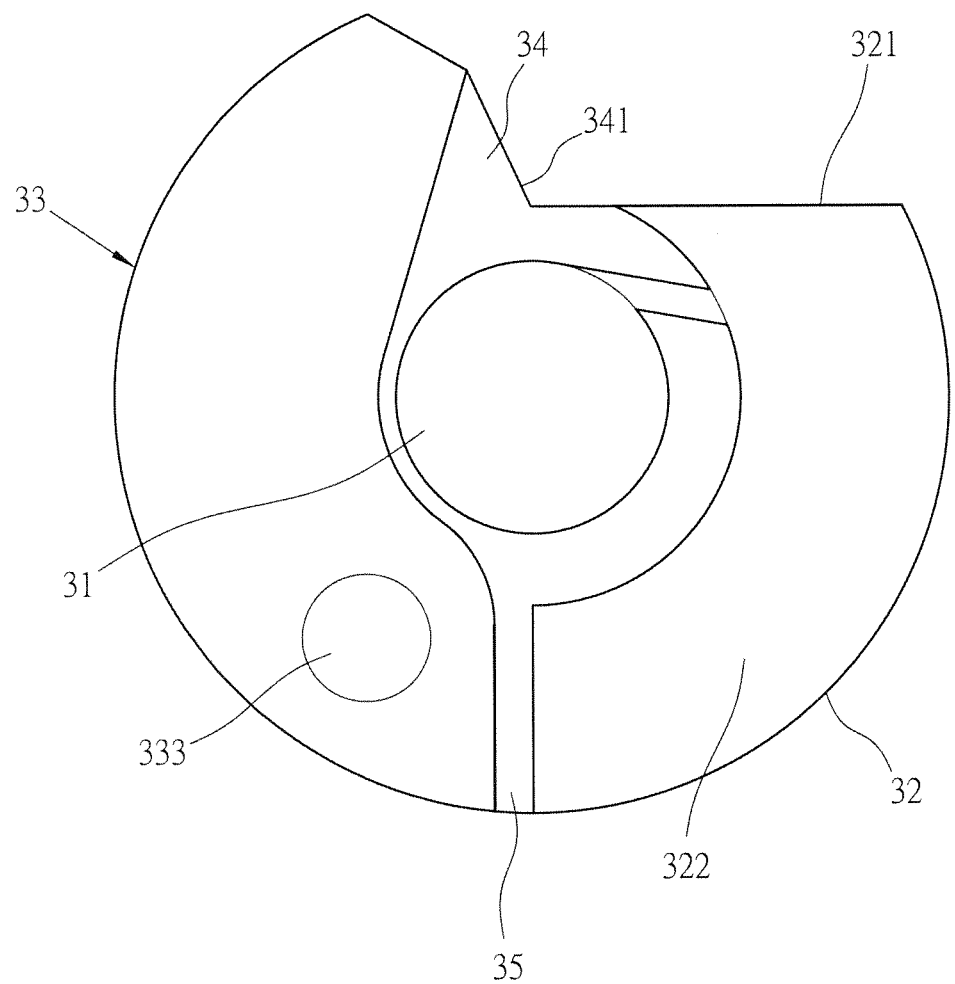
FIG. 4 shows the driving member of the brake assembly of the present invention.
Figure 5:
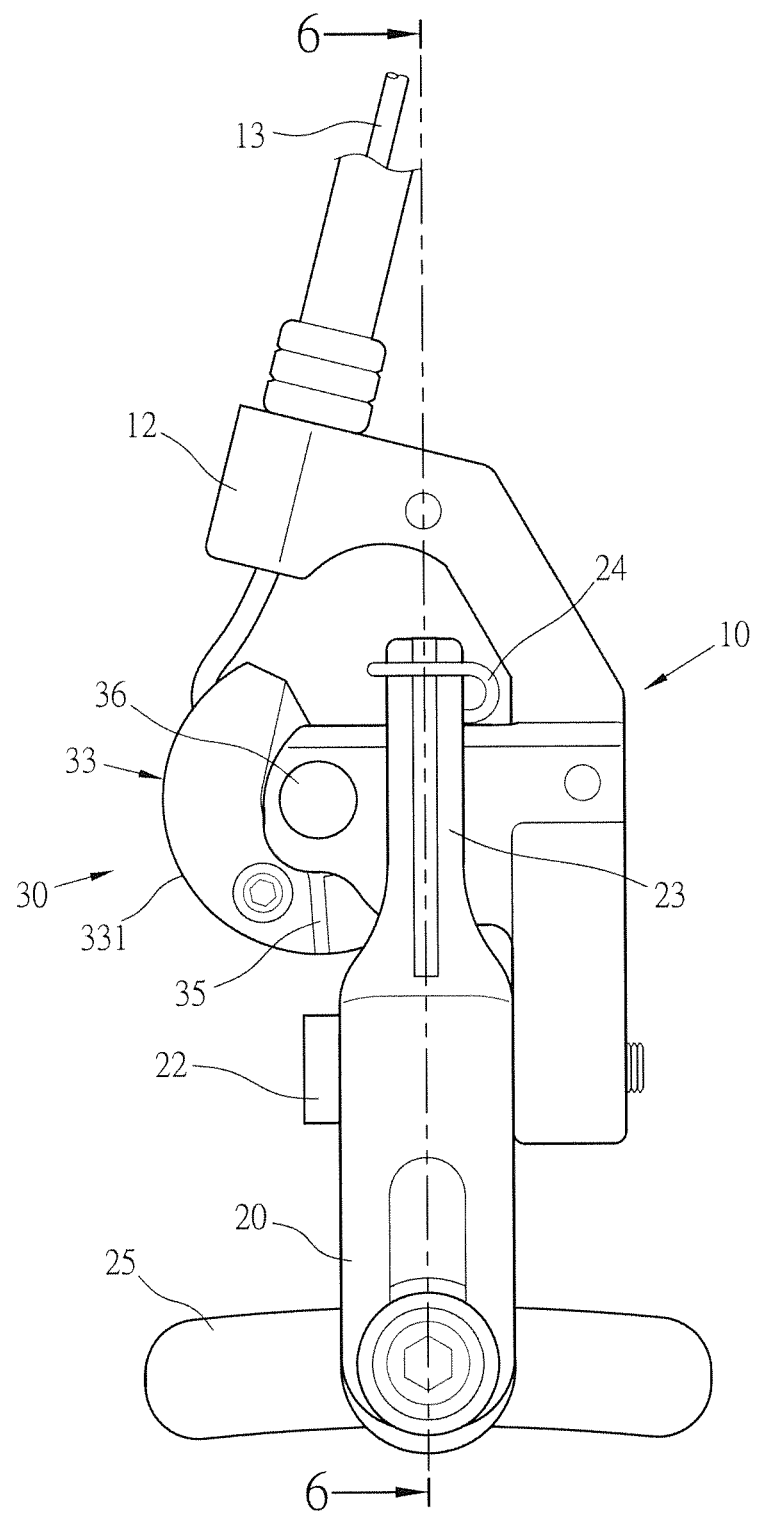
FIG. 5 is a cross sectional view of the brake assembly of the present invention.
Figure 6:
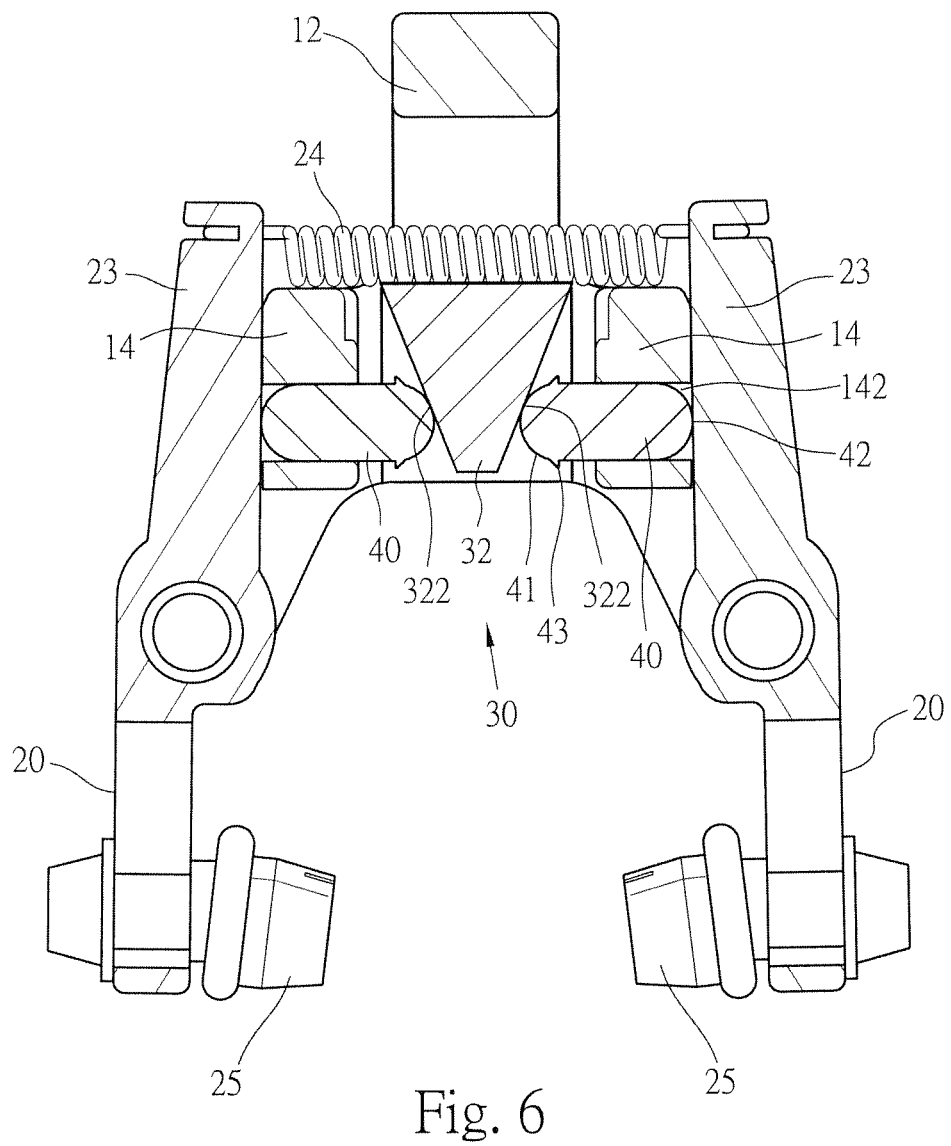
FIG. 6 is a partial cross sectional view of the brake assembly of the present invention.

Referring to FIGS. 1 to 9, the brake assembly of the present invention comprises a base 10, two arms 20 and a driving member 30.

The base 10 has a connection portion 11 so as to be connected to a bicycle. A frame 12 is connected to the top of the base 10 and has a passage 121. A hose 122 extends through the passage 121 and the brake cable 13 extends through the hose 122. The base 10 has two first connection parts 14 extending from two sides thereof and the two first connection parts 14 extend toward the same direction. Each of the two first connection parts 14 has a first hole 141 and a second hole 142. Two second connection parts 15 respectively from the underside of the base 10 and each second connection part 15 of the base 10 has a connection hole 151.

The two arms 20 are identical and located corresponding to each other. Each arm 20 has a pivotal portion 21 and two pivots 22 respectively extend through the pivotal portions 21 and the connection holes 151 corresponding thereto so as to pivotably connect the arms 20 to the second connection parts 15. Each arm 20 has an extension section 23 extending from the top end thereof. A first returning member 24 is connected between the two extension sections 23 of the two arms 20. Each arm 20 has a brake pad 25 connected to the lower end thereof.

The driving member 30 is a cam-shaped member and has a central hole 31 defined centrally therethrough. A driving part 32 and a positioning portion 33 extend radially from outside of the driving member 30. Each of two sides of the driving member 30 has a first stop 34 and a second stop 35. The first and second stops 34, 35 are located between the driving part 32 and the positioning portion 33. The first stop 34 is a cone-shaped member and the second stop 35 is an elongate plate. The first side of the first stop 34 is connected to the positioning portion 33 and the second side of the first stop 34 is an inclined face 341 which is connected to the driving part 32. The second stop 35 has a surface 321 connected with the inclined face 341. The driving part 32 has two recessed and curved driving faces 322 formed on two sides thereof and each driving face 322 is narrowed and connected to the second stop 35. the positioning portion 33 has two semi-circular radial protrusions 331 which are respectively connected to the first and second stops 34, 35. A space 332 is defined between the two protrusions 331. The brake cable 13 extends through the space 332. Each of the two protrusions 331 has a positioning hole 333 which is located close to the second stop 35. A socket 334 is located in each of the two positioning holes 333. A through hole 335 is defined radially through the socket 334 and faces the space 332. The driving member 30 is located between the two first connection parts 14, and the positioning portion 33 faces outward. The central hole 31 and the first holes 141 are located in alignment with each other, a rod 36 extends through the first holes 141 and the central hole 31 to connect the driving member 30 between the two first connection parts 14. two second returning members 37 are respectively located between two open ends of the central hole 31 and the two first connection parts 14. The two action members 40 respectively located between the two second holes 142 and the two driving faces 322. Each action member 40 is a cylindrical member and has a first end 41 and a second end 42. The first and second ends 41, 42 are two rounded ends. A flange 43 extends outward from the first end 41 of each action member 40. The two respective second ends 42 of the two action members 40 respective extend through the two second holes 142, and each of the two first ends 41 contacts the driving face 322 corresponding thereto. Each of the two second ends 42 is located corresponding to the extension section 23 corresponding thereto. The flanges 43 prevent the action members 40 from dropping out from the second holes 142. The brake cable 13 extends through the space 332 and the through hole 335. Two positioning members 38 respectively extend through the two positioning holes 333 and two ends of the sockets 334. The two positioning members 38 contact the brake cable 13 and position the brake cable 13.

When braking the bicycle, the positioning portion 33 is driven by the brake cable 13 to pivot the driving member 30, and the driving part 32 is pivoted so that the two action members 40 move linearly because the two respective first ends 41 are restricted by the driving faces 322. The second ends 42 push the two extension sections 23 to pivot the arms 20. The brake pads 25 clamp the rim 26 to brake the bicycle. The first stops 34 restrict the action members 40 within a pre-set range. When the brake cable 13 is released, the driving member 30 returns by the second returning members 37, and the two arms 20 return by the first returning member 24. The two action members 40 move linearly and are restricted by the second stops 35.

The base 10 is pivotably connected to the cam-shaped driving member 30 which has a driving part 32 on outside thereof and the driving part 32 has two curved driving faces 322 formed on two ends thereof. Two action members 40 are respectively located between the arms 20 and the two curved driving faces 322. When the driving member 30 is pivoted by the brake cable 13, the driving member 30 pushes the action members 40 by the driving faces 322 to pivot the arms 20 to brake the wheel. The distance between the driving member 30 and the brake cable 13 is short so that the transmission of the force is direct and quick. The two curved driving faces 322 of the driving member 30 move the action members 40 to move linearly and the two curved driving faces 322 are smooth surfaces so that the action members 40 are driven easily and the arms 20 are evenly pivoted to ensure the braking feature. The number of the parts of the brake assembly is less than the conventional brake assemblies so that the brake assembly is light and compact. The brake assembly reduces wind resistance.

When assembling, the two arms 20 are pivotably connected to the two second connection parts 15, and the first returning member 24 is connected between the two arms 20. The action members 40 are respectively inserted into the two second holes 142, and the driving member 30 is pivotably connected between the two first connection parts 14 by the rod 36. The first ends 41 of the two action members 40 contact the driving faces 322. The brake cable 13 extends through the frame 12 and is connected to the positioning portion 33 of the driving member 30 to finish the assembling of the brake assembly.

Figure 7:
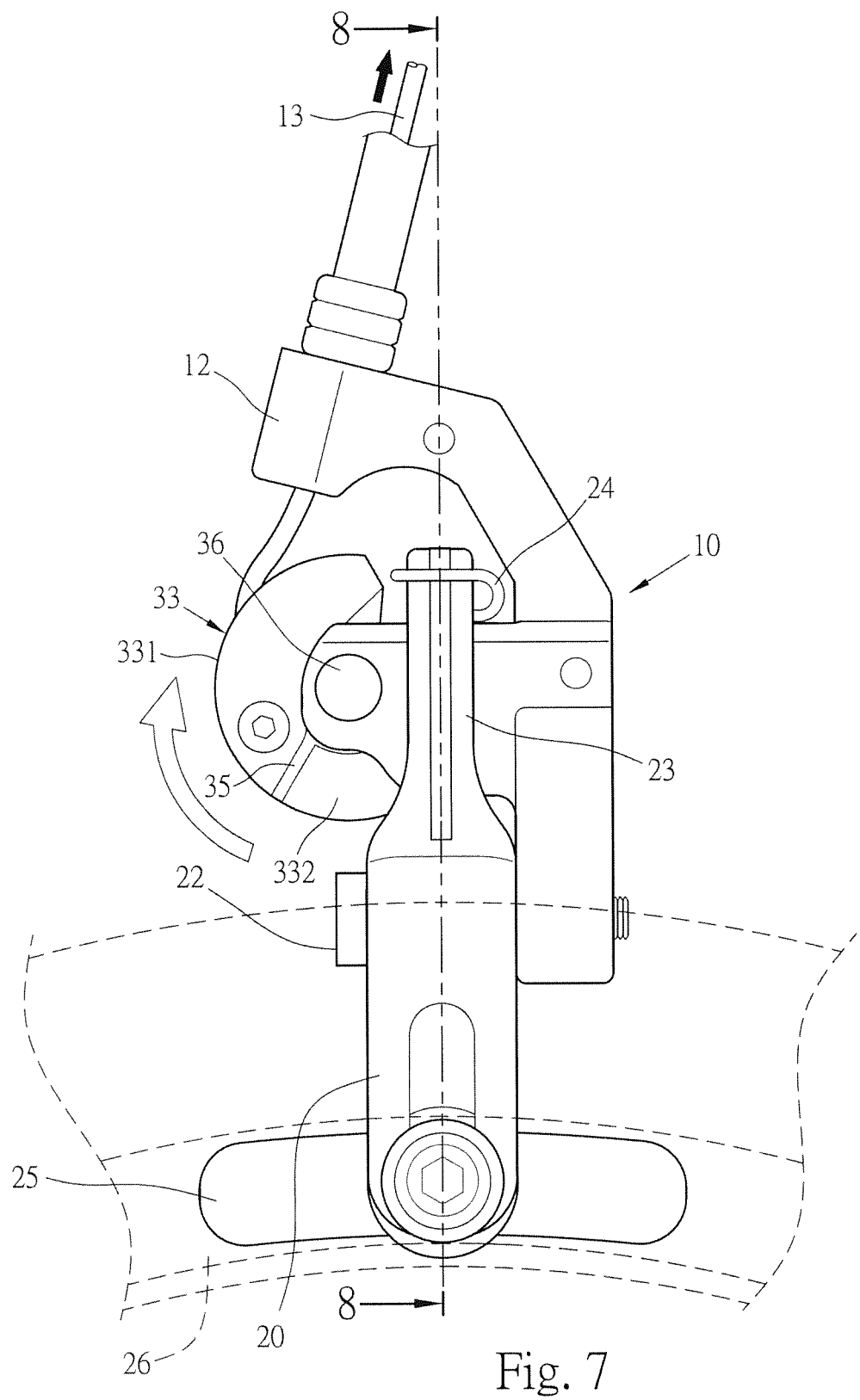
FIG. 7 is a side view to show the action of the brake assembly of the present invention.
Figure 8:
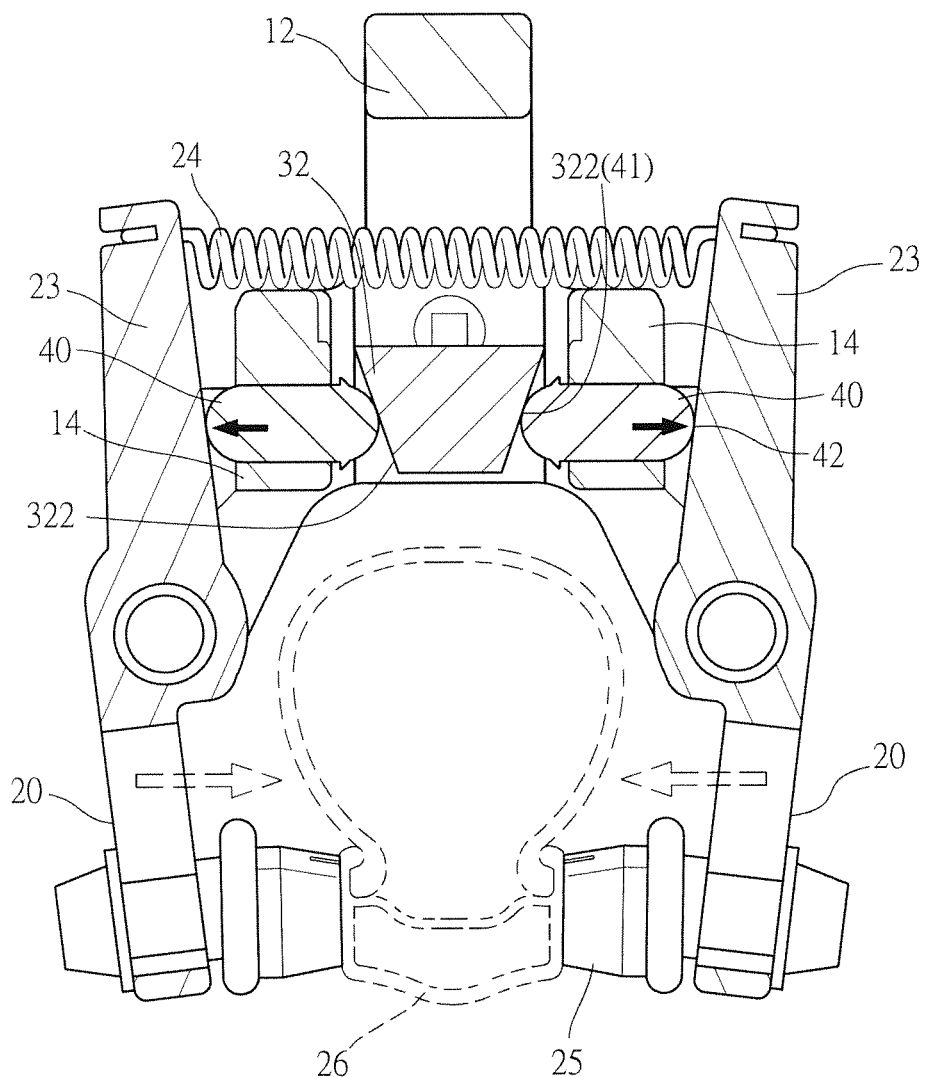
FIG. 8 is a cross sectional view to show the action of the brake assembly of the present invention.
Figure 9:
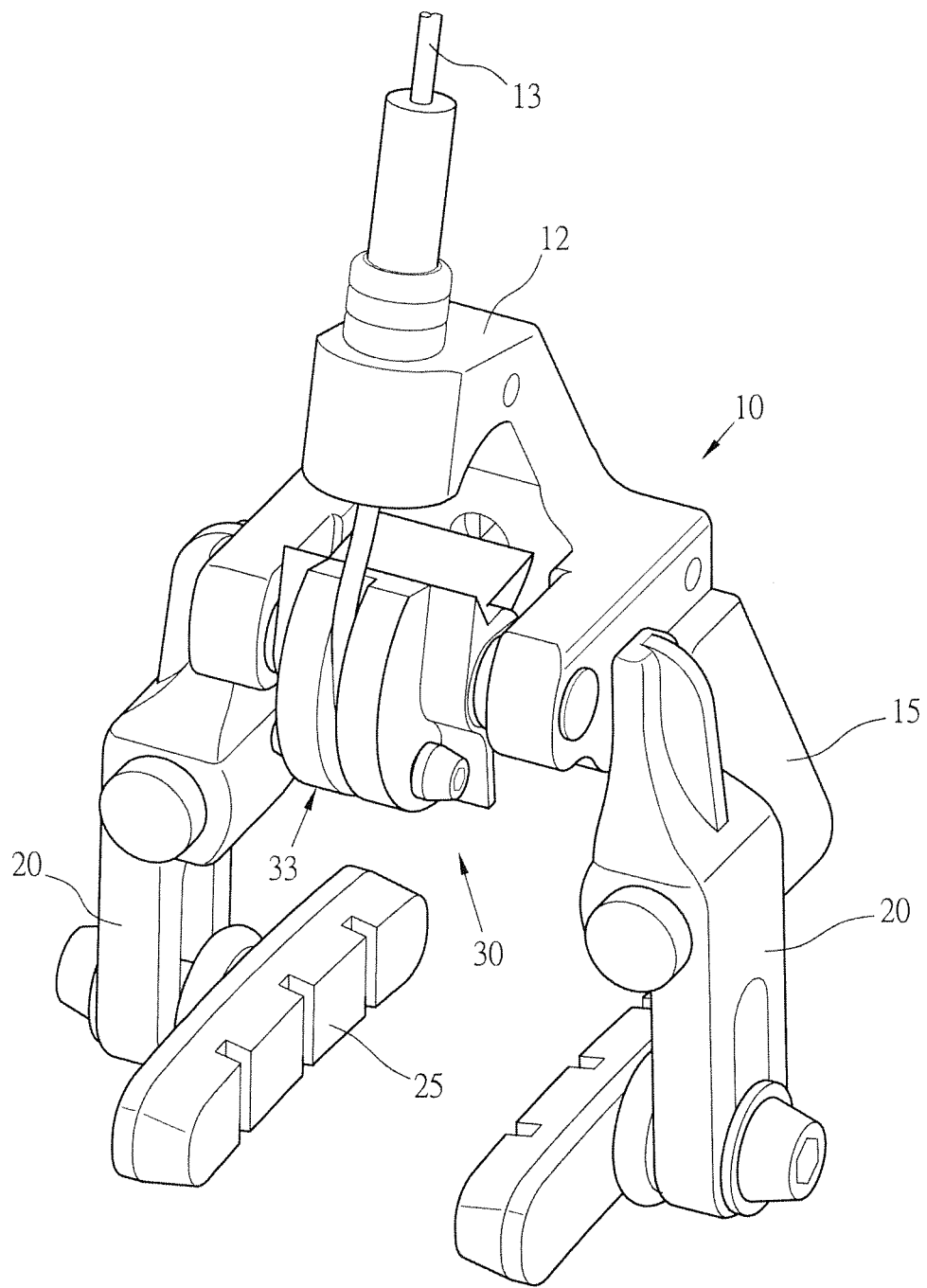
FIG. 9 is a perspective view to show the second embodiment of the brake assembly of the present invention.
Figure 10:
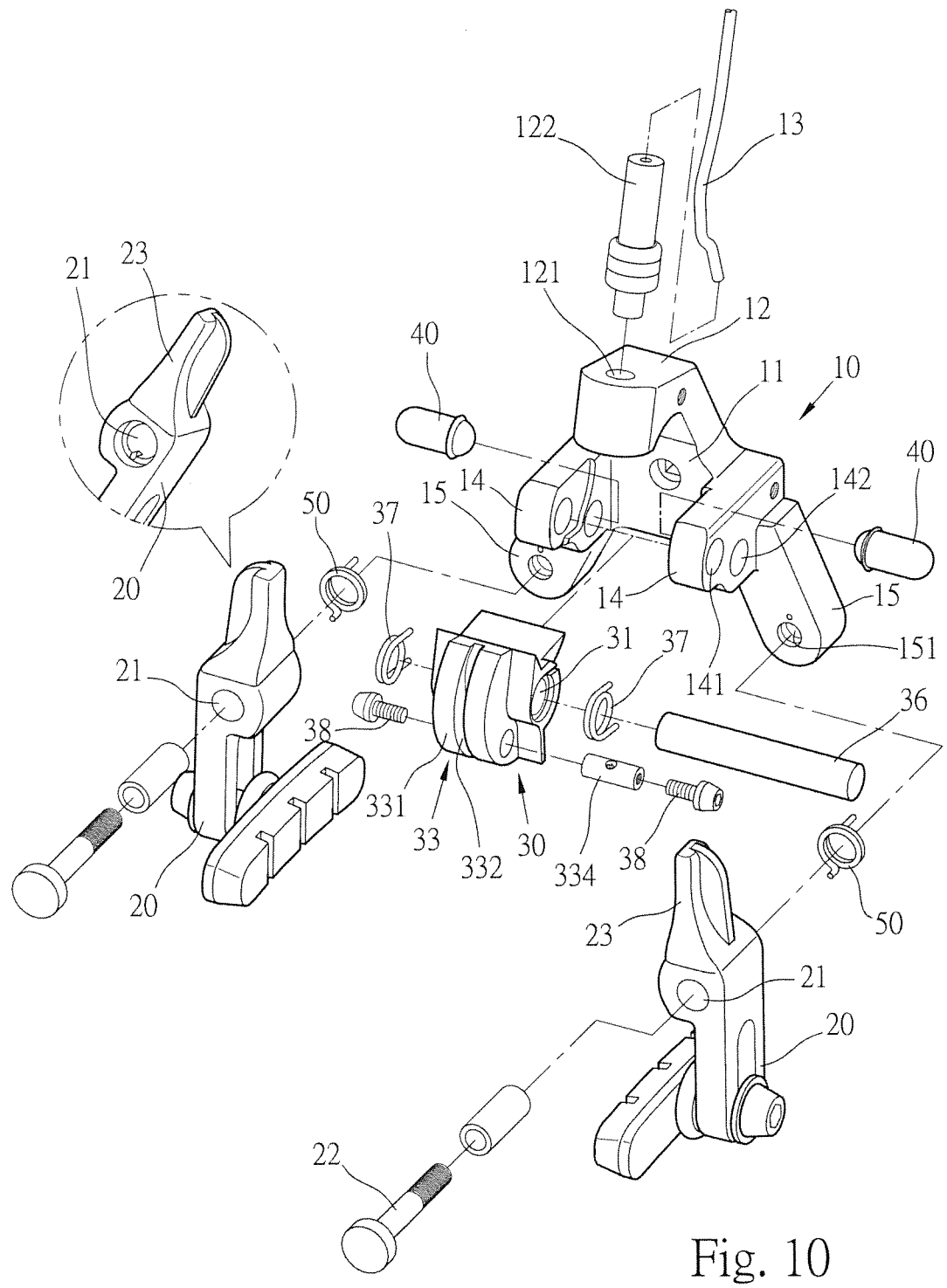
FIG. 10 is an exploded view to show the second embodiment of the brake assembly of the present invention.
Figure 11:
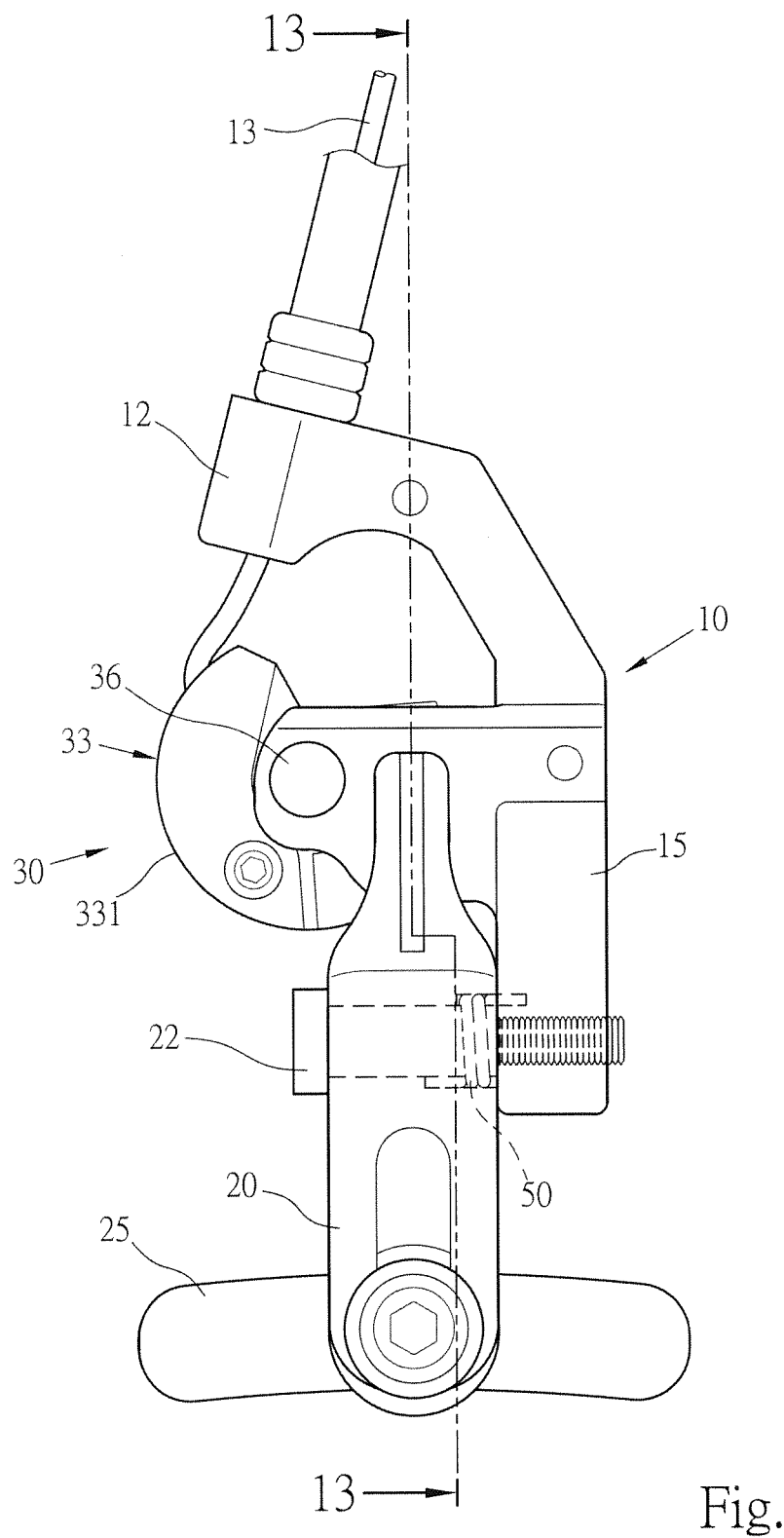
FIG. 11 is a side view to show the second embodiment of the brake assembly of the present invention.
Figure 12:
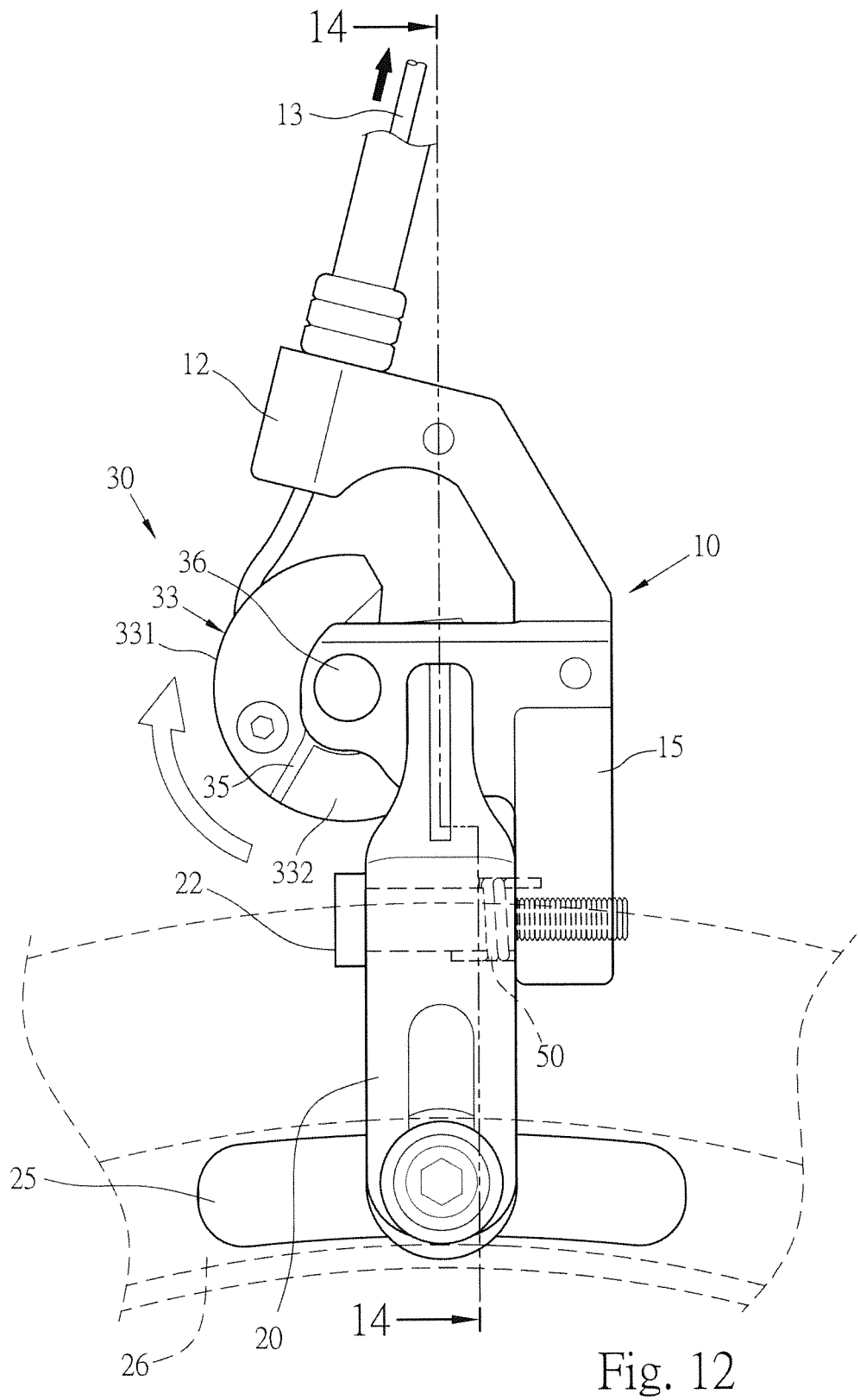
FIG. 12 is a side view to show the action of the second embodiment of the brake assembly of the present invention.
Figure 13:
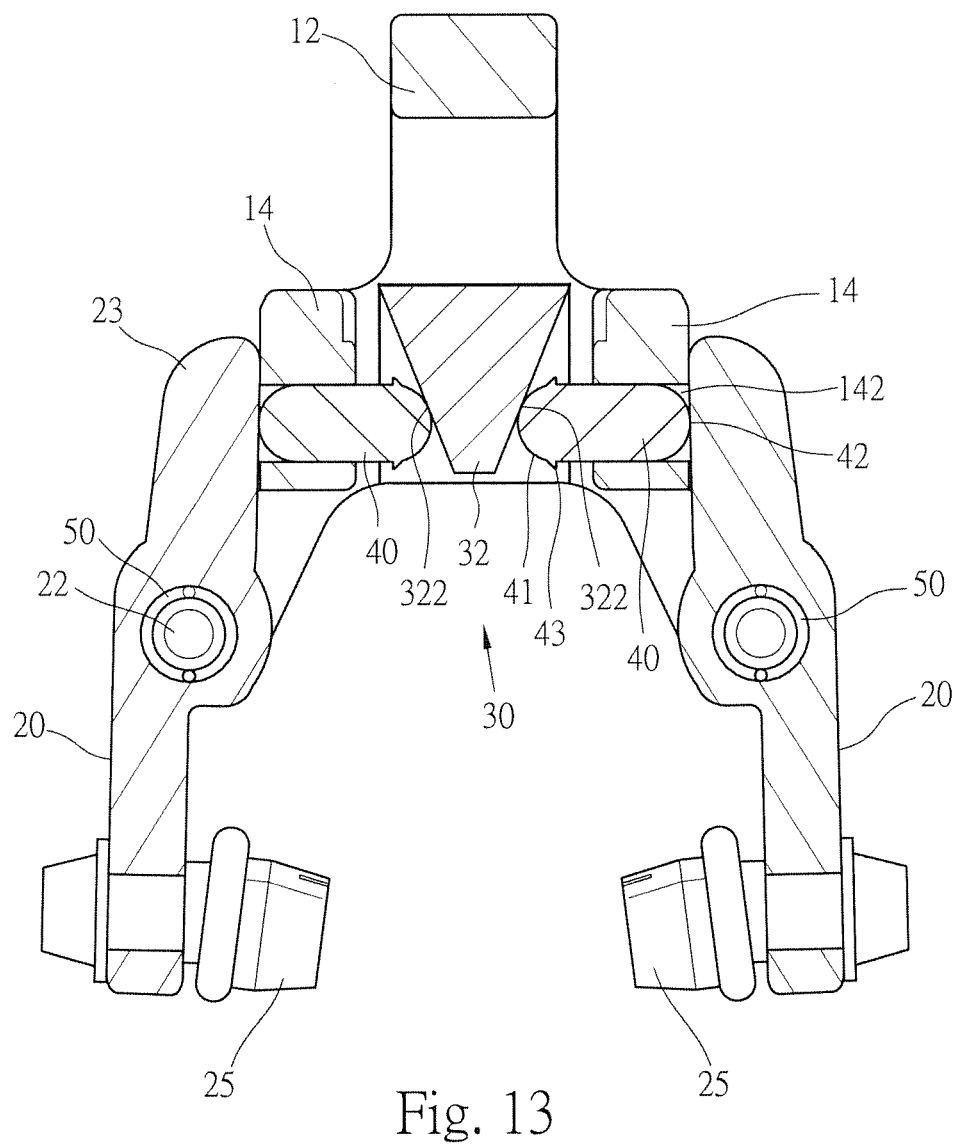
FIG. 13 is a partial cross sectional view to show the action of the second embodiment of the brake assembly of the present invention.
Figure 14:
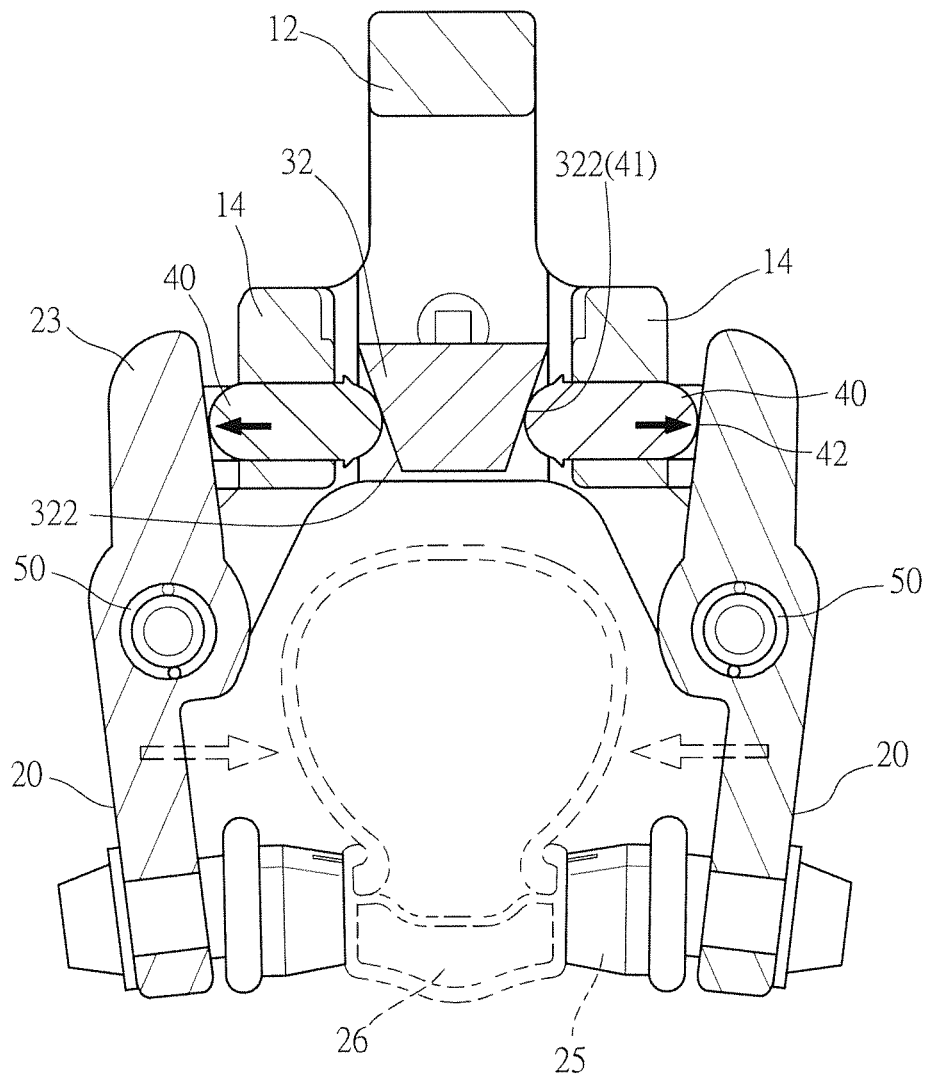
FIG. 14 is a cross sectional view to show the action of the second embodiment of the brake assembly of the present invention.
Figure 15:
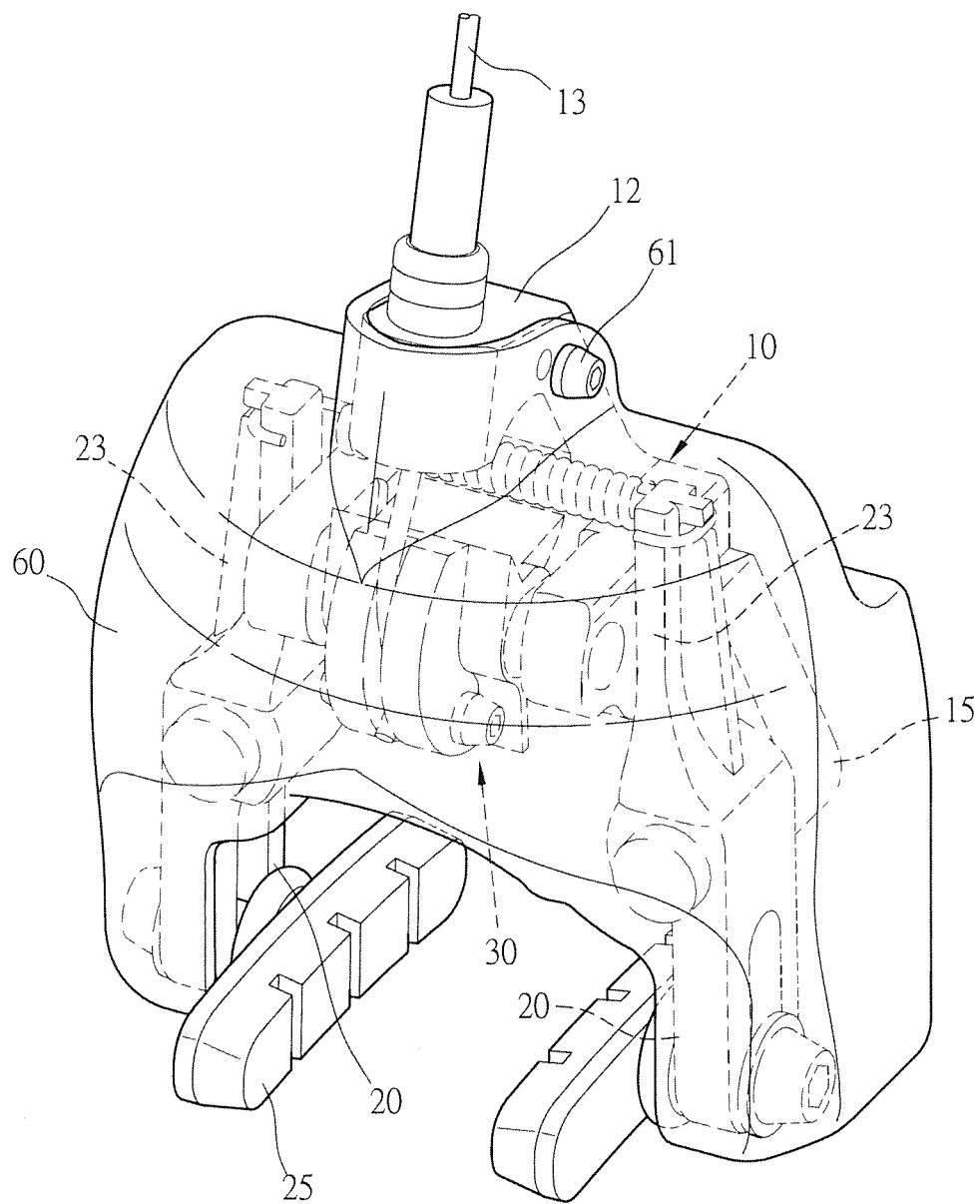
FIG. 15 is a perspective view to show the third embodiment of the brake assembly of the present invention.
Figure 16:
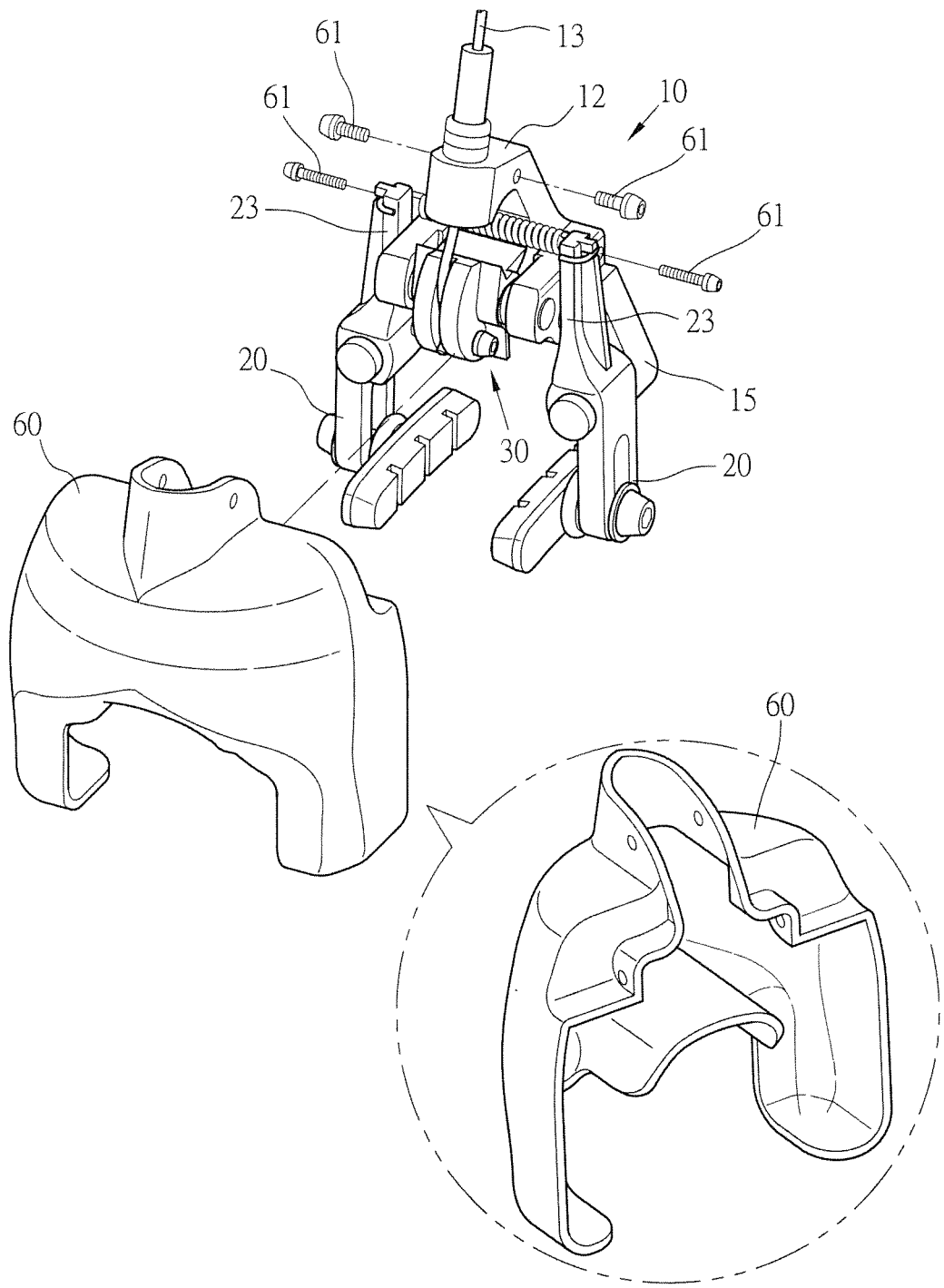
FIG. 16 is an exploded view to show the third embodiment of the brake assembly of the present invention.
Figure 17:
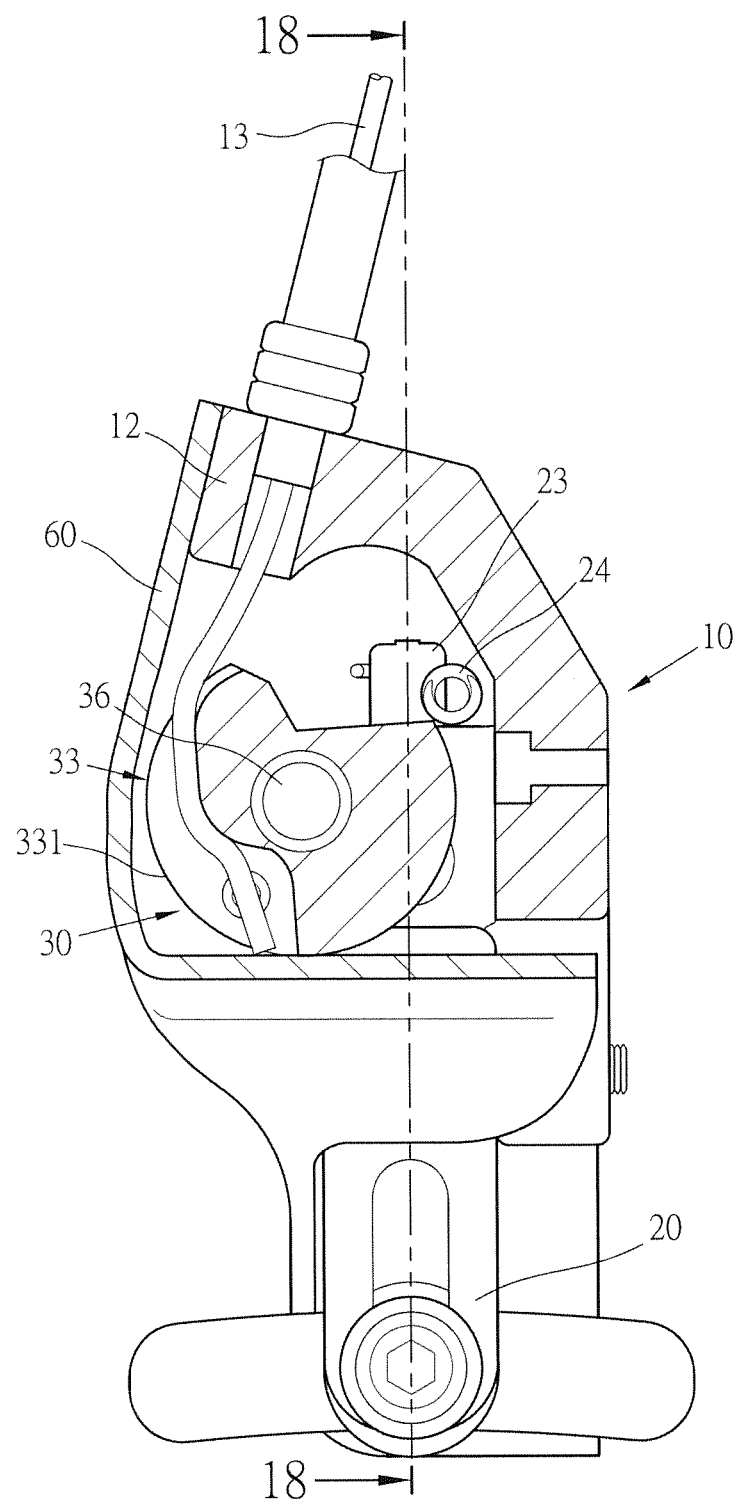
FIG. 17 is a side view to show the third embodiment of the brake assembly of the present invention.
Figure 18:
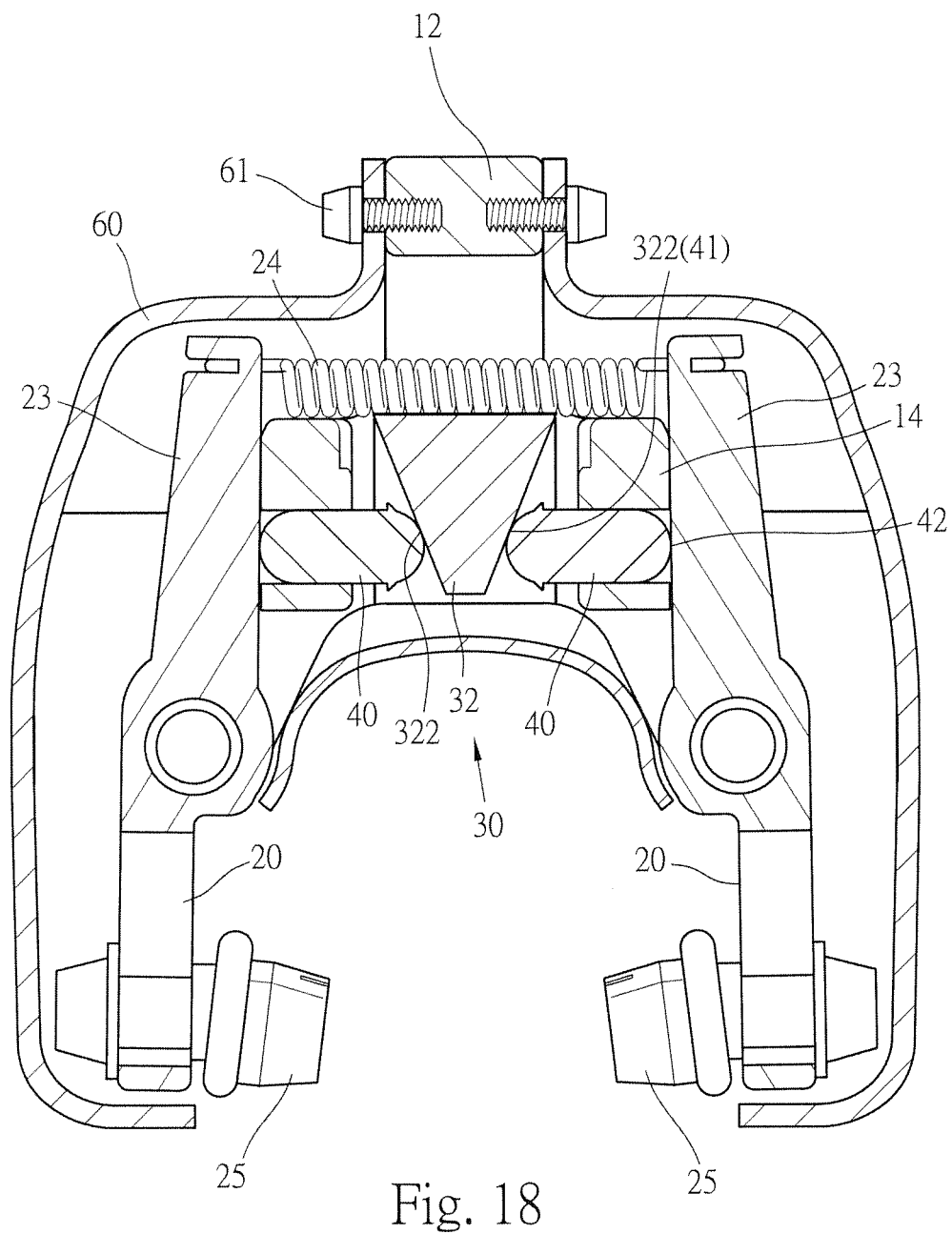
FIG. 18 is a cross sectional view to show the action of the third embodiment of the brake assembly of the present invention.

As shown in FIGS. 7 and 8, when braking, the positioning portion 33 of the driving member 30 is driven by the brake cable 13 to pivot the driving member 30. The two action members 40 move linearly because the two respective first ends 41 are restricted by the driving faces 322. The second ends 42 push the two extension sections 23 to pivot the arms 20. The brake pads 25 clamp the rim 26 to brake the bicycle. When the brake cable 13 is released, the two arms 20 return by the first returning member 24. The brake pads 25 are not in contact with the rim 26 and the driving member 30 returns by the second returning members 37. The two extension sections 23 push the two action members 40 to move linearly and return.

As shown in FIGS. 9 to 14, the second embodiment of the present invention is disclosed and two third returning members 50 are respectively located between the two pivotal portions 21 of the arms 20 and the two second connection parts 15 of the base 10. When the brake cable 13 does not apply force to the driving member 30, the two arms 20 return by the third returning members 50. By this way, the first returning member 14 can be omitted and the length of each extension section 23 can be reduced to reduce the weight and volume.

Figure 19:
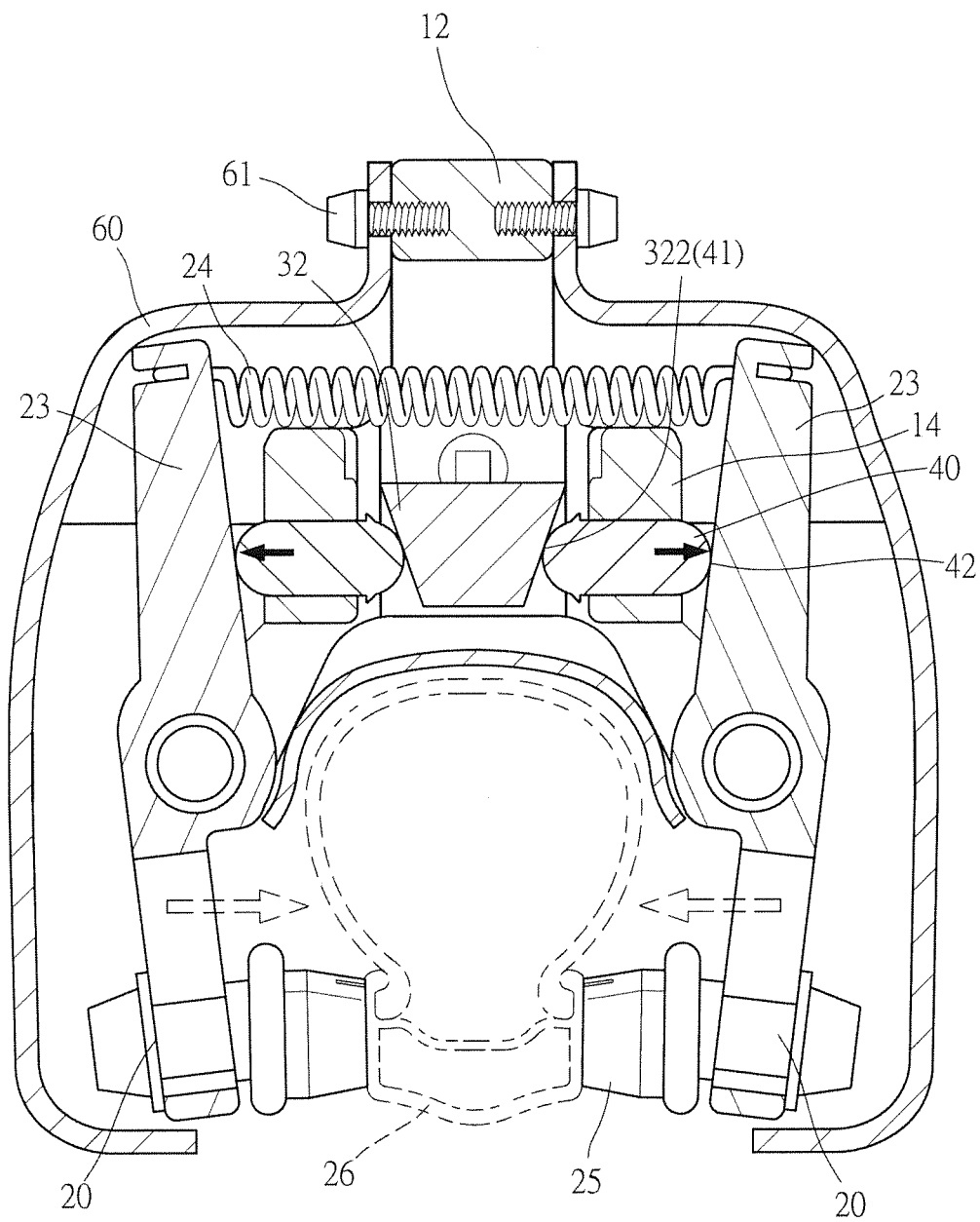
FIG. 19 is a partial cross sectional view to show the action of the third embodiment of the brake assembly of the present invention.

FIGS. 15 to 18 show the third embodiment of the present invention, a cover 60 is mounted to the base 10 and the two arms 20. The cover 60 is connected to the base 10 by at least one connection member 61 and the cover 60 is shaped to reduce the turbulence and resistance, and protects the base 10 and the arms 20 from being accessed by rain, dust and any foreign object. The cover 60 is made by resilient material. As shown in FIG. 19, when the brake cable 13 fails to apply force to the brake assembly, the extension sections 23 of the arms 20 are pivoted and contact the cover 60 so as to help the two extension sections 23 to return.

The base 10 is pivotably connected to the cam-shaped driving member 30 to which the brake cable 13 is connected. The driving part 32 is formed on outside of the driving part 32 which has two curved driving faces 322 formed on two ends thereof. Two action members 40 are respectively located between the arms 20 and the two curved driving faces 322. When the driving member 30 is pivoted by the brake cable 13, the driving member 30 pushes the action members 40 by the driving faces 322 to pivot the arms 20 to brake the wheel. The distance between the driving member 30 and the brake cable 13 is short so that the transmission of the force is direct and quick. The two curved driving faces 322 of the driving member 30 move the action members 40 to move linearly and the two curved driving faces 322 are smooth surfaces so that the action members 40 are driven easily and the arms 20 are evenly pivoted to ensure the braking feature. The number of the parts of the brake assembly is less than the conventional brake assemblies so that the brake assembly is light and compact. The brake assembly reduces wind resistance.

The first returning member 24 is connected between the two extension sections 23 of the two arms 20 to return the two arms 20. Alternatively, the two third returning members 50 are respectively located between the two pivotal portions 21 of the arms 20 and the two second connection parts 15 of the base 10 to return the arms 20. By this way, the first returning member 14 can be omitted and the length of each extension section 23 can be reduced to reduce the weight and volume. There is no wheel releasing mechanism needed between the base 10 and the two arms 20, by pressing and pivoting the two arms 20, the two brake pads 25 are separated from the rim 26.

The cover 60 is mounted to the base 10 and the two arms 20. The cover 60 shaped to reduce turbulence and resistance. The cover 60 is made by resilient material to help the two arms 20 to return.

While we have shown and described the embodiment in accordance with the present invention, it should be clear to those skilled in the art that further embodiments may be made without departing from the scope of the present invention.

What is claimed is:

1. A brake assembly comprising:

a base adapted to be connected to a bicycle, the base having two first connection parts extending from two sides thereof and the two first connection parts extending toward the same direction, each of the two first connection parts having a first hole and a second hole, two second connection parts respectively from an underside of the base;

two arms respectively and pivotably connected to the two second connection parts, each arm having an extension section extending from a top end thereof, each arm having a brake pad connected to a lower end thereof, and a driving member having a central hole defined centrally therethrough, a driving part and a positioning portion extending radially from outside of the driving member, the driving part having two curved driving face formed on two ends thereof, the driving member located between the two first connection parts, a brake cable connected to the positioning portion, a rod extending through the first hole and the central hole, two action members respectively located in the two second holes, each action member having a first end thereof contacting the driving face corresponding thereto, a second end of each action member located corresponding to the extension section of the arm corresponding thereto;

wherein each of two sides of the driving member has a first stop and a second stop, the first and second stops are located between the driving part and the positionin portion, the first stop is a cone-shaped member and the second stop is an elongate plate, the driving part has two recessed and curved driving faces formed on two sides thereof and each driving face is narrowed and connected to the second stop, the positioning portion has a space defined therein, the brake cable extends through the space.

2. The brake assembly as claimed in claim 1, wherein the base has a connection portion which is adapted to be connected to the bicycle, a frame is connected to a top of the base and has a passage, a hose extends through the passage and the brake cable extends through the hose.

3. The brake assembly as claimed in claim 1, wherein the two arms are identical and located corresponding to each other, each arm has a pivotal portion, each second connection part of the base has a connection hole, each of two pivots extends through the pivotal portion and the connection hole corresponding thereto.

4. The brake assembly as claimed in claim 1, wherein a first returning member is connected between the two extension sections of the two arms.

5. The brake assembly as claimed in claim 1, wherein the positioning portion has two radial protrusions and said space is further defined between the two protrusions, each of the two protrusions has a positioning hole which is located close to the second stop, a socket is located in each of the two positioning holes, a through hole is defined radially through the socket, the brake cable further extends through the through hole, two positioning members respectively extend through the two positioning holes and two ends of the sockets, the two positioning members contact the brake cable.

6. The brake assembly as claimed in claim 1, wherein two second returning members are respectively located between two open ends of the central hole and the two first connection parts.

7. The brake assembly as claimed in claim 1, wherein the action members each are a cylindrical member which has a first end and a second end, the first and second ends are two rounded ends, a flange extends outward from the first end of each action member, the two respective second ends of the two action members respective extend through the two second holes, each of the two first ends contacts the driving face corresponding thereto, each of the two second ends is located corresponding to the extension section corresponding thereto.

8. The brake assembly as claimed in claim 3, wherein two third returning members are respectively located between the two pivotal portions of the arms and the two second connection parts of the base.

9. The brake assembly as claimed in claim 1, wherein a cover is mounted to the base and the two arms.

10. A brake assembly comprising:
a base adapted to be connected to a bicycle, the base having two first connection parts extending from two sides thereof and the two first connection parts extending toward the same direction, each of the two first connection parts having a first hole and a second hole, two second connection parts respectively from an underside of the base;
two arms respectively and pivotably connected to the two second connection parts, each arm having an extension section extending from a top end thereof, each arm having a brake pad connected to a lower end thereof, and
a driving member having a central hole defined centrally therethrough, a driving part and a positioning portion extending radially from outside of the driving member, the driving part having two curved driving face formed on two ends thereof, the driving member located between the two first connection parts, a brake cable connected to the positioning portion, a rod extending through the first hole and the central hole, two action members respectively located in the two second holes, each action member having a first end thereof contacting the driving face corresponding thereto, a second end of each action member located corresponding to the extension section of the arm corresponding thereto;
wherein a first and second stops are located between the driving part and the positioning portion, the first stop is a cone-shaped member and has a first side and a second side, the first side of the first stop is connected to the positioning portion and the second side of the first stop is an inclined face which is connected to the driving part, the second stop is an elongate plate and has a surface connected with the inclined face, the driving part has two recessed and curved driving faces formed on two sides thereof and each driving face is narrowed and connected to the second stop, the positioning portion has two radial protrusions which are respectively connected to the first and second stops, a space is defined between the two protrusions, the brake cable extends through the space.

11. The brake assembly as claimed in claim 10, wherein the base has a connection portion which is adapted to be connected to the bicycle, a frame is connected to a top of the base and has a passage, a hose extends through the passage and the brake cable extends through the hose.

12. The brake assembly as claimed in claim 10, wherein the two arms are identical and located corresponding to each other, each arm has a pivotal portion, each second connection part of the base has a connection hole, each of two pivots extends through the pivotal portion and the connection hole corresponding thereto.

13. The brake assembly as claimed in claim 10, wherein a first returning member is connected between the two extension sections of the two arms.

14. The brake assembly as claimed in claim 10, wherein the positioning portion has two radial protrusions and said space is further defined between the two protrusions, each of the two protrusions has a positioning hole which is located close to the second stop, a socket is located in each of the two positioning holes, a through hole is defined radially through the socket, the brake cable further extends through the through hole, two positioning members respectively extend through the two positioning holes and two ends of the sockets, the two positioning members contact the brake cable.

15. The brake assembly as claimed in claim 10, wherein two second returning members are respectively located between two open ends of the central hole and the two first connection parts.

16. The brake assembly as claimed in claim 10, wherein the action members each are a cylindrical member which has a first end and a second end, the first and second ends are two rounded ends, a flange extends outward from the first end of each action member, the two respective second ends of the two action members respective extend through the two second holes, each of the two first ends contacts the driving face corresponding thereto, each of the two second ends is located corresponding to the extension section corresponding thereto.

17. The brake assembly as claimed in claim 12, wherein two third returning members are respectively located between the two pivotal portions of the arms and the two second connection parts of the base.

18. The brake assembly as claimed in claim 10, wherein a cover is mounted to the base and the two arms.

\* \* \* \* \*